(12) United States Patent
Baumann

(10) Patent No.: US 11,110,518 B2
(45) Date of Patent: Sep. 7, 2021

(54) METHOD AND APPARATUS FOR MANUFACTURING A THREE-DIMENSIONAL OBJECT

(71) Applicant: EOS GmbH Electro Optical Systems, Krailling (DE)

(72) Inventor: Andreas Baumann, Gräfelfing (DE)

(73) Assignee: EOS GmbH Electro Optical Systems, Krailling (DE)

( * ) Notice: Subject to any disclaimer, the term of this patent is extended or adjusted under 35 U.S.C. 154(b) by 173 days.

(21) Appl. No.: 15/775,237

(22) PCT Filed: Nov. 11, 2016

(86) PCT No.: PCT/EP2016/077498
§ 371 (c)(1),
(2) Date: May 10, 2018

(87) PCT Pub. No.: WO2017/081293
PCT Pub. Date: May 18, 2017

(65) Prior Publication Data
US 2018/0318927 A1    Nov. 8, 2018

(30) Foreign Application Priority Data
Nov. 13, 2015   (DE) .......................... 102015222456.2

(51) Int. Cl.
*B33Y 10/00* (2015.01)
*B33Y 50/02* (2015.01)
(Continued)

(52) U.S. Cl.
CPC .......... *B22F 12/00* (2021.01); *B23K 26/1224* (2015.10); *B23K 26/342* (2015.10);
(Continued)

(58) Field of Classification Search
CPC ............ B22F 3/1055; B22F 2003/1056; B22F 2999/00; B22F 2201/20; B22F 2003/1057;
(Continued)

(56) References Cited

U.S. PATENT DOCUMENTS 5,730,925 A    3/1998 Mattes et al.
6,583,379 B1   6/2003 Meiners et al.
(Continued)

FOREIGN PATENT DOCUMENTS

CN    101932429    12/2010
CN    106660269    5/2017
(Continued)

OTHER PUBLICATIONS

International Search Report for Application No. PCT/EP2016/077498 dated Jan. 20, 2017, 2 pages.
(Continued)

*Primary Examiner* — Rebecca Janssen
(74) *Attorney, Agent, or Firm* — Seyfarth Shaw LLP

(57) ABSTRACT

A method of manufacturing a three-dimensional object by a layer-by-layer application and selective solidification of a building material by exposure to a radiation. A hollow body is arranged in a process chamber above a build area which hollow body substantially extends from the build area in a direction of an upper side of the wall of the process chamber. Gas is supplied to the process chamber in such a manner and gas is discharged from the process chamber in such a manner that a lower pressure exists in the region of the process chamber lying within the hollow body than in the region of the process chamber lying outside the hollow body.

11 Claims, 3 Drawing Sheets

(51) Int. Cl.
  *B29C 64/153* (2017.01)
  *B29C 64/25* (2017.01)
  *B23K 26/12* (2014.01)
  *B23K 26/342* (2014.01)
  *B29C 64/364* (2017.01)
  *B29C 64/393* (2017.01)
  *B28B 1/00* (2006.01)
  *B22F 10/10* (2021.01)
  *B22F 12/00* (2021.01)
  *B33Y 30/00* (2015.01)
  *B28B 17/00* (2006.01)

(52) U.S. Cl.
  CPC .......... *B28B 1/001* (2013.01); *B28B 17/0081* (2013.01); *B29C 64/153* (2017.08); *B29C 64/25* (2017.08); *B29C 64/364* (2017.08); *B29C 64/393* (2017.08); *B33Y 10/00* (2014.12); *B33Y 30/00* (2014.12); *B33Y 50/02* (2014.12); *B22F 10/10* (2021.01); *B22F 2201/20* (2013.01); *B22F 2999/00* (2013.01); *Y02P 10/25* (2015.11)

(58) Field of Classification Search
  CPC .......... B22F 12/00; B22F 10/30; B22F 10/20; B22F 10/10; B29C 64/386; B29C 64/393; B29C 64/364; B29C 64/20; B29C 64/153; B29C 64/25; B28B 17/0081; B28B 1/001; B23K 26/342; B23K 26/1224; B33Y 50/02; B33Y 30/00; B33Y 10/00; Y02P 10/295; Y02P 10/25
  See application file for complete search history.

(56) References Cited

U.S. PATENT DOCUMENTS

| | | | |
|---|---|---|---|
| 2009/0017220 | A1 | 1/2009 | Muller et al. |
| 2011/0285060 | A1* | 11/2011 | Yamamoto ............ B29C 64/153 |
| | | | 264/401 |
| 2012/0126457 | A1 | 5/2012 | Abe et al. |
| 2014/0175708 | A1* | 6/2014 | Echigo ................. B29C 64/286 |
| | | | 264/460 |
| 2017/0072468 | A1 | 3/2017 | Schilling et al. |
| 2017/0136538 | A1* | 5/2017 | Yoshimura ............ B22F 3/1007 |
| 2017/0216916 | A1 | 8/2017 | Nyrhila et al. |

FOREIGN PATENT DOCUMENTS

| | | | |
|---|---|---|---|
| DE | 3923829 | 1/1991 | |
| DE | 19514740 | 4/1996 | |
| DE | 19853947 | 2/2000 | |
| DE | 102004031881 | 1/2006 | |
| DE | 102004031881 B4 * | 11/2007 | ............ B08B 15/04 |
| DE | 102013215377 | 2/2015 | |
| DE | 102014205875 | 10/2015 | |
| EP | 2431113 | 3/2012 | |
| EP | 3131740 | 2/2017 | |
| WO | 1992008592 | 5/1992 | |
| WO | 2015144884 | 1/2015 | |
| WO | 2015173355 | 11/2015 | |

OTHER PUBLICATIONS

European Search Report for Application No. 102015222456.2 dated Aug. 10, 2016, 7 pages.

* cited by examiner

METHOD AND APPARATUS FOR MANUFACTURING A THREE-DIMENSIONAL OBJECT

TECHNICAL FIELD OF THE INVENTION

The present invention relates to a method and an apparatus for manufacturing a three-dimensional object by a layer-by-layer application and selective solidification of a building material.

BACKGROUND OF THE INVENTION

Methods and apparatuses of this type are, for instance, used in Rapid Prototyping, Rapid Tooling, and Additive Manufacturing. An example of such a method is known as "selective laser sintering" or "selective laser melting". In the course of this, a thin layer of a building material in powder form is repeatedly applied to a build area, and the building material in each layer is selectively solidified by selectively irradiating it using a laser beam, i.e. the building material is partially or completely melted at these points and solidifies thus forming a material bond. In this sense, a solidification point is a position subjected to this process, i.e. at which the partial or complete melting is (currently) performed.

Document DE 195 14 740 C1 describes a method of manufacturing a three-dimensional object by means of a selective laser sintering or laser melting as well as an apparatus for performing this method.

Document DE 198 53 947 C1 describes a process chamber for the selective laser sintering or laser melting in whose side walls inlet and outlet openings for a protective gas streaming through the process chamber are arranged.

When solidifying a building material in powder form, so-called splashes are generated depending on the kind of the material used, in particular when sintering or melting metal powder. When splashes are generated, material is ripped out of the point being partially or completely melted. Also other impurities, for instance, smoke, condensates and/or other gaseous or solid substances, are released at the point of solidification. Generated splashes, smoke, and condensates as well as released gaseous or solid substances can lead to contaminations of the apparatus. Furthermore, generated splashes, smoke, and condensates as well as released gaseous or solid substances lead to a partial absorption and/or partial scattering and, thus, to a partial loss of the radiation directed to the building material for its selective solidification.

SUMMARY OF THE INVENTION

An object of the present invention consists in providing an improved method or, respectively, an improved apparatus for manufacturing a three-dimensional object by a layer-by-layer application and selective solidification of a building material. In the course of this, a particularly preferred goal is to prevent disturbing impurities in critical regions of the apparatus, particularly in the beam path of the beam, as far as possible or, respectively, to rapidly remove them from critical regions.

The object is achieved by a method according to claim 1, a computer program according to claim 12, a control device according to claim 13, an equipment and/or upgrade kit according to claim 14, and, respectively, an apparatus according to claim 15. Further developments of the invention are provided in the dependent claims, wherein the features mentioned in the dependent claims for one claim category and the features set forth below in respect of the subject-matter belonging to one claim category may also be understood as a further development of the subject-matter of any other claim category.

The method according to the invention is a method of manufacturing a three-dimensional object by a layer-by-layer application and selective solidification of a building material. The method comprises the steps of applying a layer of the building material to a build area in a process chamber and of selectively solidifying those points of the applied layer which correspond to the cross-section of the object in this layer by exposure to a radiation. The steps of applying and selectively solidifying are repeated until the three-dimensional object is completed. Above the build area, a hollow body is arranged in the process chamber which hollow body substantially extends from the build area in a direction of the upper side of the wall of the process chamber (preferably substantially reaching up to this upper side). Herein, the hollow body is understood as a body having a substantially solid shape which at least partially encloses a hollow space as an inside of the hollow body. In the course of this, a structure of the hollow body itself can have a hollow or massive construction. Gas is supplied to the process chamber in such a manner and gas is discharged from the process chamber in such a manner that a lower pressure exists in the region of the process chamber lying within the hollow body than in the region of the process chamber lying outside the hollow body. In other words, a pressure difference is generated between the hollow body (lower pressure) and the inner region of the process chamber lying outside the hollow body (higher pressure). The advantages of this pressure difference can be illustrated, for instance, with the help of the following three scenarios:

According to the first scenario, the hollow body is substantially sealed in a gas-tight manner against the remaining inner region of the process chamber. Then, the relative underpressure in the hollow body has, for instance, the advantage that specific pressure conditions optimised for the respective manufacturing process are rendered possible locally, namely only within the hollow body itself, whereas these pressure conditions need not be realised in the remaining volume of the process chamber since the actual manufacturing process is, in fact, not taking place there.

According to the second scenario, whose particular possible embodiments are comprehensively explained further below, a passage (e.g. in the wall of the hollow body or at its outer boundaries) is provided between the inside of the hollow body and the remaining inner region of the process chamber. Then, the relative underpressure in the hollow body effects a purposeful gas stream in a direction of the inside of the hollow body.

According to a third scenario, the hollow body is closed as such with respect to the remaining inner region of the process chamber, it is, however, not (permanently) sufficiently gas-tight. Also here, it is ensured by the relative underpressure in the hollow body that, should gas flow between the remaining inner region of the process chamber and the inside of the hollow body, the gas flow direction is always substantially in a direction of the inside of the hollow body.

Preferably, gas streams from the region of the process chamber lying outside the hollow body through a gap, i.e. through a passage, between the build area and the lower side of the hollow body into the region of the process chamber lying within the hollow body. Additionally or alternatively, the upper side of the hollow body facing a coupling window arranged in a wall of the process chamber is at least partially open, so that gas streams from the region of the process chamber lying outside the hollow body through a gap between the upper side of the wall of the process chamber and the upper side of the hollow body into the region of the process chamber lying within the hollow body.

Thus, this embodiment is a specifically preferred one of the second scenario outlined above.

Thereby, for instance, the contamination of constructional elements mounted in the process chamber by splashes, smoke, condensates, and/or other gaseous or solid substances is reduced or prevented. This, for instance, reduces the complexity of cleaning these constructional elements.

Besides, thereby, for instance, splashes, smoke, condensates, and/or other gaseous or solid substances are rapidly removed from the region of the process chamber which the radiation needs to pass through in order to arrive at the build area.

Potentially (but not necessarily), a strong gas stream above the build area may be dispensed with, whereby it is prevented that particles of the applied layer are entrained by the gas stream. The entrainment of particles of the applied layer would, as the case may be, negatively affect the properties of the object to be manufactured.

The mentioned hollow body is, for instance, constructed such that it has substantially closed side walls and is at least partially open at a lower side facing the build area as well as at an upper side facing the upper side of the wall of the process chamber, i.e. the process chamber ceiling. It can extend substantially from the build area up to the upper side of the wall of the process chamber, so that gaps are provided between the lower side of the hollow body and the build area or, respectively, the upper side of the hollow body and the upper side of the wall of the process chamber. In the course of this, the gaps are, in particular, constructed such that gas streams through the gaps into the inside of the hollow body in the form of a purposeful, directed gas stream when a higher pressure exists outside the hollow body than inside it. In the course of this, the gas stream is, in particular, such that splashes, smoke, and condensates present in the inside of the hollow body as well as released gaseous or solid substances cannot move against the gas stream through the gaps.

In principle, the invention comprises all embodiments in which the pressure conditions as described above are realised. Preferably (specifically within the scope of the above-described first scenario), gas is supplied to and or discharged from the hollow body in such a manner that a gas pressure exists within the hollow body which is lower than the average atmospheric pressure on earth. Such an underpressure or, respectively, vacuum application has, inter alia, the potential of a higher process stability. By the locally confined application of the underpressure or, respectively, vacuum in the hollow body, the effort for generating and maintaining an underpressure or vacuum can be significantly reduced and the effect can be nevertheless thoroughly realised exactly at the intended target location (i.e. in the region of the build area).

As regards the gas pressure in the region of the process chamber lying outside the hollow body, so it is generally preferred that it is applied such that it is higher or equal to the pressure outside the process chamber. Typically, the atmospheric ambient pressure exists outside the process chamber. This applies to all three of the above-described scenarios and also for those embodiments where no underpressure or, respectively, vacuum is applied in the hollow body.

In principle, the spatial arrangement of the radiation source is freely selectable within the scope of the invention.

It is preferred that the radiation is generated by means of an irradiation device arranged outside the process chamber and is coupled into the process chamber (and further into the hollow body) through a coupling window arranged at the upper side of a wall of the process chamber. Hereby, an effective spatial separation of the corresponding optical elements from the process chamber, where potentially disturbing particles are generated, is possible.

Preferably, the method according to the invention is carried out such that gas is discharged from the process chamber through a gas outlet line connected to the inside of the hollow body via a gas outlet opening. Thereby, for instance, contaminated gas is continually discharged from the process chamber, namely directly from the hollow body. That can be disposed of or supplied to a gas cleaning unit (e.g. a filter).

Preferably, the method according to the invention is carried out such that gas is supplied to the process chamber through a gas inlet line connected to the region of the process chamber lying outside the hollow body via a gas inlet opening. Thereby, for instance, fresh gas is continually supplied to the process chamber.

Preferably, the method according to the invention is carried out such that gas is supplied to the process chamber (as the case may be, additionally to the gas line mentioned in the preceding paragraph) through a gas inlet line connected to the inside of the hollow body via a (as the case may be, further) gas inlet opening. Thereby, for instance, a gas stream can be generated in the inside of the hollow body, which there purposefully and locally reduces or prevents an escaping of splashes, smoke, condensates, and/or other released gaseous or solid substances out of the hollow body, whereby a contamination of constructional elements arranged within the process chamber (but outside the hollow body) is reduced or prevented.

Preferably, the method according to the invention is carried out such that the gas supplied to the process chamber through a gas inlet line connected to the inside of the hollow body via the gas inlet opening is guided in the form of a substantially laminar stream through the region of the inside of the hollow body adjacent to the surface of the coupling window facing the hollow body. Thereby, for instance, contaminations of the coupling window are reduced or prevented.

Within the scope of the embodiments described in the last preceding two paragraphs it is preferred that a first portion of the gas is supplied via the gas inlet opening connected to the inside of the hollow body and a second portion of the gas is guided into the region of the process chamber outside the hollow body via a further gas inlet opening. This can be, for instance, advantageously carried out by branching off the first portion and the second portion of the gas from each other from a common gas stream by a gas branching, preferably in a pre-chamber of the hollow body.

Preferably, the method according to the invention is carried out such that the application of a layer of the building material to the build area is performed by means of a recoater moving in a horizontal direction, and the movement of the recoater is coupled to that of the hollow body. Thereby it is, for instance, achieved that the hollow body does not obstruct the movement of the recoater.

The computer program according to the invention is loadable into a programmable control device and comprises program code means in order to perform all steps of the method according to the invention when the computer program is executed in the control device. Thereby it is, for instance, possible to perform the method according to the invention in a programme-based manner.

The control device according to the invention is a control device for an apparatus for manufacturing a three-dimensional object by a layer-by-layer application and selective solidification of a building material. This apparatus performs the following steps during operation: applying a layer of the building material to a build area in a process chamber, selectively solidifying those points of the applied layer which correspond to the cross-section of the object in this layer by exposure to a radiation, and repeating the steps of applying and selectively solidifying until the three-dimensional object is completed. In the course of this, a hollow body is arranged in the process chamber above the build area which hollow body substantially extends from the build area in a direction of the upper side of the wall of the process chamber. The control device according to the invention is configured to supply gas to the process chamber in such a manner and to discharge gas from the process chamber in such a manner that a lower pressure exists in the region of the process chamber lying within the hollow body than in the region of the process chamber lying outside the hollow body. The control device is configured to this in that it generates the corresponding control commands during operation. Thereby, for instance, a control device is provided which is capable of controlling an apparatus for manufacturing a three-dimensional object in such a manner that it performs the method according to the invention.

The equipment kit and/or upgrade kit according to the invention consists of a hollow body suitable for use in a method according to the invention and a control device according to the invention. Thereby it is, for instance, possible to upgrade an apparatus for manufacturing a three-dimensional object by a layer-by-layer application and selective solidification of a building material, with which the method according to the invention cannot be carried out, in such a manner that the method can be carried out.

The apparatus according to the invention is an apparatus for manufacturing a three-dimensional object by a layer-by-layer application and selective solidification of a building material comprising an application device for applying a layer of the building material to a build area in a process chamber of the apparatus, an irradiation device for selectively solidifying those points of the applied layer which correspond to the cross-section of the object in this layer by exposure to a radiation, and an equipment and/or upgrade kit according to the invention. Thereby, for instance, an apparatus is provided with which the method according to the invention can be carried out.

BRIEF DESCRIPTION OF THE DRAWINGS

Further features and the usefulness of the invention will arise from the description of examples of embodiments of the apparatus according to the invention on the basis of the accompanying drawings.

DETAILED DESCRIPTION OF THE EMBODIMENTS

Figure 1:
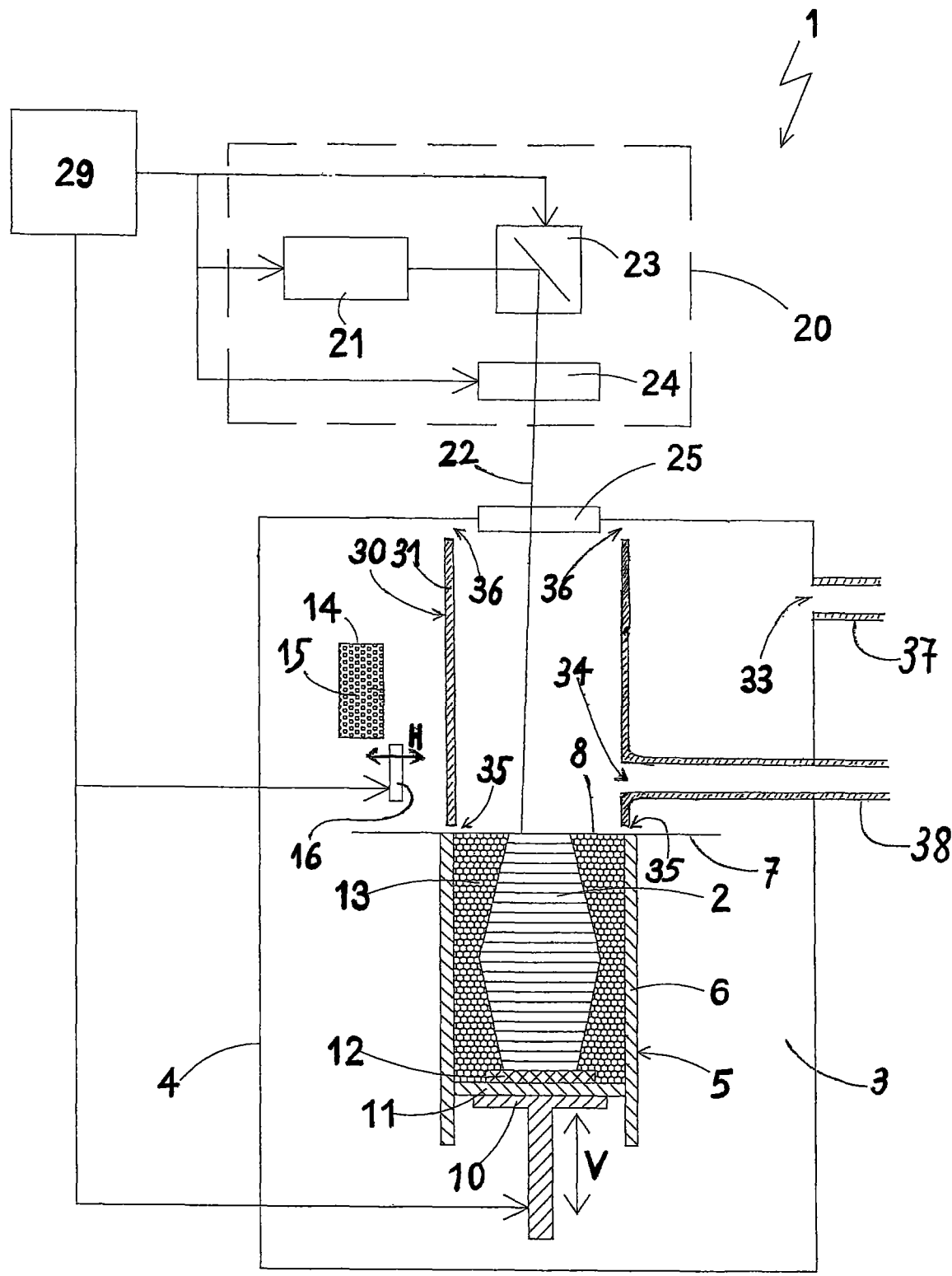
FIG. 1 is a schematic cross-sectional view of an apparatus for a layer-by-layer manufacturing of a three-dimensional object according to an example of an embodiment of the present invention.

The apparatus shown in FIG. 1 is a laser sintering or laser melting apparatus 1 for manufacturing an object 2.

The laser sintering or laser melting apparatus 1 contains a process chamber 3 having a chamber wall 4. In the process chamber 3 a container 5 open to the top and having a wall 6 is arranged. In the container 5 a support 10 movable in a vertical direction V is arranged at which a base plate 11 is mounted which closes the container 5 in a downward direction and thereby forms its bottom. The base plate 11 may be a plate formed separately from the support 10, which is attached to the support 10, or it may be integrally formed with the support 10. Depending on a powder used and a process, a building platform 12 on which the object 2 is built up may further be mounted on the base plate 11. However, the object 2 may also be built up on the base plate 11 itself, which then serves as a building platform.

In FIG. 1, the object to be built in the container 5 on the building platform 12 is shown below a working plane 7 in an intermediate state. It consists of several solidified layers and is surrounded by building material 13 remaining non-solidified.

The laser sintering or laser melting apparatus 1 further contains a storage container 14 for a building material 15 in powder form which can be solidified by an electromagnetic radiation and a recoater 16 movable in a horizontal direction H for applying layers of the building material 15 to a build area 8 in the working plane 7. The wall of the process chamber 3 contains at its upper side a coupling window 25 for coupling in the radiation, which serves to solidify the building material 15, into the process chamber 3.

The laser sintering or laser melting apparatus 1 further contains an irradiation device 20 having a laser 21 generating a laser beam 22, which is deflected via a deflecting device 23 and is focused by a focusing device 24 via the coupling window 25 onto the build area 8 in the working plane 7.

The laser sintering or laser melting apparatus 1 further contains a control device 29 via which the individual component parts of the apparatus 1 are controlled in a coordinated manner for performing the building process. The control device 29 may contain a CPU whose operation is controlled by a computer program (software).

The laser sintering or laser melting apparatus 1 is further provided with a hollow body 30 having a wall 31 which hollow body is arranged within the process chamber 3 above the build area 8, extends substantially from the build area 8 up to the upper side of the process chamber 3, and is partially open at least at its lower side facing the build area 8.

The process chamber is connected to a gas inlet line 37 and to a gas outlet line 38.

In the example of an embodiment shown in FIG. 1 the gas inlet line 37 is connected via a gas inlet opening 33 to the region of the process chamber lying outside the hollow body 30. The gas inlet opening 33 is provided at the wall 4 of the process chamber 3. The gas outlet line 38 is connected via a gas outlet opening 34 to the region of the process chamber 3 lying inside the hollow body 30.

The hollow body 30 has, for instance, substantially the shape of a cylinder, wherein the term "cylinder" is understood in a general mathematical sense. For cylindrical hollow bodies it is contemplated to design the cylinder base area substantially circular, oval, or polygonal, for instance, rectangular, however, the shape of the cylinder base area is generally not subject to limitations. The hollow body 30 can have an arbitrary shape. In the course of this, the side walls of the hollow body 30 substantially reach from the build area 8 up to the upper side of the wall 4 of the process chamber 3.

The hollow body 30 is open at least at its lower side. As in the case of the example of an embodiment shown in FIG. 1, this can mean that the hollow body 30 does not possess a wall at its lower side, i.e. ends in a downward direction with the lower edge of its side surface or, respectively, the lower edges of its side surfaces. In the course of this, it is preferred that the open lower side of the hollow body 30 and the build area are substantially congruent. However, it is also possible within the scope of the invention to design the hollow body 30 as being open at its lower side in the sense that it is provided at its lower side with a wall possessing an opening. In the course of this, it is preferred that the opening and the build area 8 are substantially congruent.

The lower side of the hollow body 30 is facing the build area 8 and is arranged at a distance therefrom. Between the build area 8 and the lower side of the hollow body 30 there is a gap 35 which is, for instance, circumferential or provided sector by sector and which constitutes a connection between the region of the process chamber 3 lying inside the hollow body 30 and the region of the process chamber 3 lying outside the hollow body 30, which connection can be flown through by gas.

In the example of an embodiment shown in FIG. 1 the hollow body 30 is open also at its upper side, namely in the sense that the hollow body 30 does not possess a wall at its upper side, i.e. ends in an upward direction with the upper edge of its side surface or, respectively, the upper edges of its side surfaces. Therefore, also between the upper side of the hollow body 30 and the upper side of the wall 4 of the process chamber 3 there is a gap 36 which is, for instance, circumferential or provided sector by sector. This gap constitutes a further connection between the region of the process chamber 3 lying inside the hollow body 30 and the region of the process chamber 3 lying outside the hollow body, which connection can be flown through by gas.

In another example of an embodiment the hollow body 30 is not open at its upper side, i.e. substantially closed in a gas-tight manner. In the course of this, the upper side of the hollow body 30 is at least partially designed as being transparent for the radiation.

In an example of an embodiment the mentioned hollow body 30 is at least partially open at both its lower side facing the build area 8 and its upper side facing the upper side of the wall 4 of the process chamber 3. In the course of this, the hollow body 30 extends substantially from the build area 8 up to the upper side of the wall 4 of the process chamber 3. In the course of this, the distances between the lower side of the hollow body 30 and the build area 8 or, respectively, between the upper side of the hollow body 30 and the upper side of the wall 4 of the process chamber 3 are chosen such that gaps 35, 36 are provided between the lower side of the hollow body 30 and the build area 8 or, respectively, the upper side of the hollow body 30 and the upper side of the wall 4 of the process chamber 3. The gaps 35, 36 are, in particular, circumferential, i.e. provided along the entire circumference of the upper side or, respectively, the lower side of the hollow body 30. The gaps 35, 36 constitute a spatial connection between the inside of the hollow body 30 and the region of the process chamber 3 lying outside the hollow body 30, through which connection gas can stream. In the course of this, the gaps 35, 36 are, in particular, small, i.e. the distances between the lower side of the hollow body 30 and the build area 8 or, respectively, the upper side of the hollow body 30 and the upper side of the wall 4 of the process chamber 3 are chosen such that gas streams through the gaps 35, 36 in the form of a purposeful, directed gas stream into the inside of the hollow body 30 when a higher pressure exists outside the hollow body 30 than inside it. In the course of this, the gas stream is, in particular, such that splashes, smoke, and condensates as well as released gaseous or solid substances present in the inside of the hollow body 30 cannot move against the gas stream through the gaps 35, 36. The distances between the lower side of the hollow body 30 and the build area 8 are preferably ≤50 mm, still more preferably ≤10 mm, in particular preferably ≤1 mm. The distances between the upper side of the hollow body 30 and the upper side of the wall 4 of the process chamber 3 are preferably ≤10 mm, still more preferably ≤2 mm, in particular preferably ≤0.5 mm.

It is, further, preferred that the hollow body 30 extends across the entire build area 8 so that the hollow space enclosed by the hollow body 30 has an inner width corresponding at least to the total area of the build area 8 at least in a lower region, and has a clear height substantially corresponding to the distance between the build area 8 and the upper side of the wall 4 of the process chamber 3. This has the advantage that a laser beam 22 emanating from the irradiation device 20 arranged e.g. centrally above the build area 8 can scan the entire build area 8 through openings at the upper side and at the lower side of the hollow body 30 without a necessity of moving the hollow body 30 depending on an orientation of the laser beam 22. In the course of this, the hollow space or, respectively, the hollow body 30 is not necessarily cuboid-shaped on the whole, but its cross-section may narrow in an upward direction, i.e. in a direction towards the upper side of the wall 4 of the process chamber 3. For instance, the hollow space or, respectively, the hollow body 30 can also have a pyramidal, or tent-like, or dome-like shape.

In a further example of an embodiment the mentioned hollow body 30 is movable. In particular, the hollow body 30 is movably mounted above the build area 8 so as to be movable back and forth in a direction parallel to the build area 8. This can be preferably implemented in that the movement of the hollow body 30 and the movement of the recoater 16 are coupled to each other. In the course of this, the hollow body 30 is, for instance, arranged beside the recoater 16, i.e. it is located in front of or behind the recoater 16 in a movement direction of the recoater 16. In particular, the hollow body 30 is arranged such that it is located behind the recoater 16 during an application process. In order to couple the movements of the hollow body 30 and the recoater 16, the hollow body 30 and the recoater 16 can preferably be mechanically coupled to each other.

It is particularly preferred to combine the two last-mentioned examples of embodiments, wherein the hollow body 30 is constructed such that it is moved together with the recoater 16 across the build area 8 during an application process and that gaps 35, 36 are provided between the lower side of the hollow body 30 and the build area 8 or, respectively, between the upper side of the hollow body 30 and the upper side of the wall 4 of the process chamber 3, i.e. the process chamber ceiling.

The hollow body 30 can also be constructed such that it is movable in a vertical direction, i.e. is liftable and lowerable. This results in the advantage that the recoater 16 can be moved across the build area 8 without a necessity of simultaneously moving the hollow body 30 back and forth in a horizontal direction across the build area 8.

During operation, first, the support 10 is lowered for applying a powder layer by a height preferably corresponding to the desired layer thickness. By using the recoater 16 a layer of the building material 15 in powder form is then applied. The application is carried out at least over the total cross-section of the object 2 to be manufactured, preferably across the whole build area 8. Subsequently, the cross-section of the object 2 to be manufactured is scanned by the laser beam 22, so that the building material 15 in powder form is solidified at these points. The steps are repeated as long as until the object 2 is completed and can be removed from the container 5.

The hollow body 30 can be movable back and forth in a direction substantially parallel to the build area 8 above the build area 8. In the course of this, in particular, the movement of the hollow body 30 and the movement of the recoater 16 are coupled to each other, so that the hollow body 30 moves across the build area 8 when the recoater 16 moves across the build area 8, for instance, in the course of an application process, and the hollow body 30 rests when the recoater 16 rests. In the course of this, the hollow body 30 moves, for instance, in front of or behind the recoater 16 in a movement direction of the recoater 16. In particular, in the course of this, the hollow body 30 moves behind the recoater during an application process.

The hollow body 30 can be mounted liftable and lowerable. By lifting, the distance between the lower side of the hollow body 30 and the build area 8 is increased; by lowering, it is reduced. The hollow body 30 is lifted when the recoater 16 is moved across the build area 8, for instance, during an application process, so that the recoater 16 can move below the hollow body 30. Subsequently, the hollow body 30 can be lowered again. Thus it is possible that the recoater 16 can be moved across the build area 8 without a necessity of moving the hollow body 30 back and forth across the build area 8.

While manufacturing the object 2, gas is supplied to the process chamber 3 and gas is discharged from the process chamber 3. The supply and the discharge of gas are carried out in such a manner that a lower pressure exists in the region of the process chamber 3 lying within the hollow body 30 than in the region of the process chamber 3 lying outside the hollow body 30. In the example of an embodiment of a laser sintering or laser melting apparatus 1 shown in FIG. 1, this is achieved in that gas is supplied to the process chamber through a gas inlet line 37 connected to the region of the process chamber 3 lying outside the hollow body 30 via a gas inlet opening 33, whereas gas is discharged from the process chamber 3 through a gas outlet line 38 connected to the region of the process chamber lying inside the hollow body 30 via a gas outlet opening 34. Gas streams through the gap 35 and the gap 36 from the region of the process chamber 3 lying outside the hollow body 30 into the region of the process chamber 3 lying inside the hollow body 30.

Thereby, for instance, the contamination of constructional elements mounted in the process chamber by splashes, smoke, condensates, and/or other gaseous or solid substances is reduced or prevented since it is substantially ensured by the directed gas stream that they cannot exit out of the hollow chamber 30. This, for instance, reduces the complexity of cleaning these constructional elements.

Besides, thereby, for instance, splashes, smoke, condensates, and/or other gaseous or solid substances are rapidly removed from the region of the process chamber which the radiation needs to pass through in order to arrive at the build area.

In the course of this, an excessively strong gas stream above the build area may be dispensed with, whereby it is prevented that particles of the applied layer are entrained by the gas stream. The entrainment of particles of the applied layer negatively affects the properties of the object to be manufactured.

Figure 2:
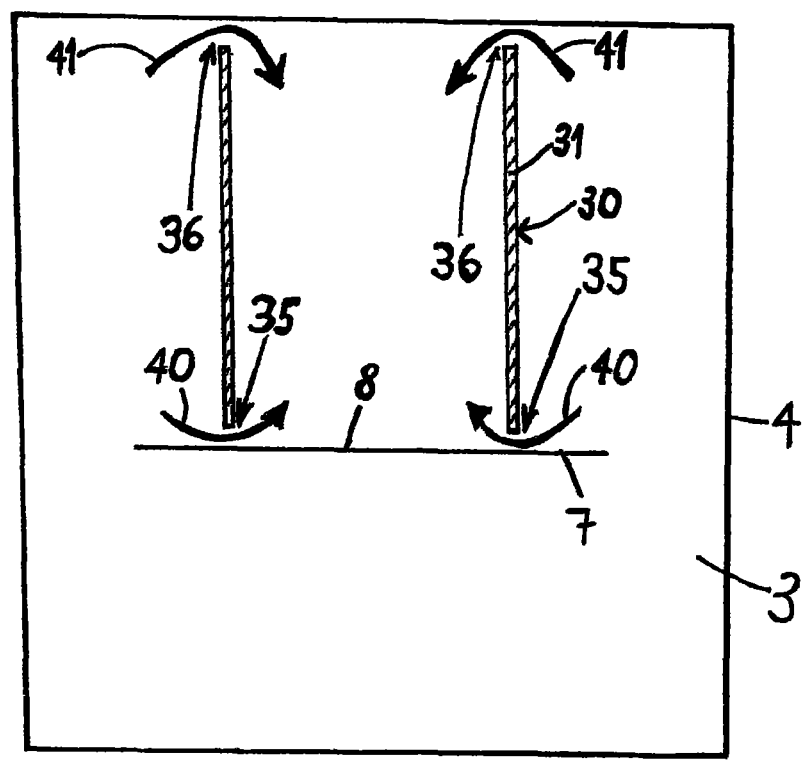
FIG. 2 is a schematic cross-sectional simplified view of the apparatus shown in FIG. 1.

In FIG. 2 a simplified view of the laser sintering or laser melting apparatus 1 shown in FIG. 1 is depicted, wherein, for the sake of clarity, the gas inlet line 37, the gas outlet line 38, and further component parts of the apparatus 1 are not shown. The arrows 40 symbolise the gas stream from the region of the process chamber 3 lying outside the hollow body 30 through the gap 35 into the region of the process chamber 3 lying inside the hollow body 30. The arrows 41 symbolise the gas stream from the region of the process chamber 3 lying outside the hollow body 30 through the gap 36 into the region of the process chamber 3 lying inside the hollow body 30.

In the course of this, directed gas streams can be generated leading through the gaps 35, 36 and purposefully preventing that splashes, smoke, and condensates as well as released gaseous or solid substances present in the inside of the hollow body 30 can move against the gas streams and thus get from the inside of the hollow body 30 into the region of the process chamber 3 lying outside the hollow body 30.

If in another example of an embodiment of a laser sintering or laser melting apparatus 1 a hollow body 30 is provided which is closed at its upper side and, thus, the gap 36 is not present, gas streams from the region of the process chamber 3 lying outside the hollow body 30 into the region of the process chamber 3 lying inside the hollow body 30 only through the gap 35. The same applies if in a further example of an embodiment of a laser sintering or laser melting apparatus 1 a hollow body 30 is provided which is closed at its lower side and, thus, the gap 35 is not present: then, gas streams from the region of the process chamber 3 lying outside the hollow body 30 into the region of the process chamber 3 lying inside the hollow body 30 only through the gap 36.

Figure 3:
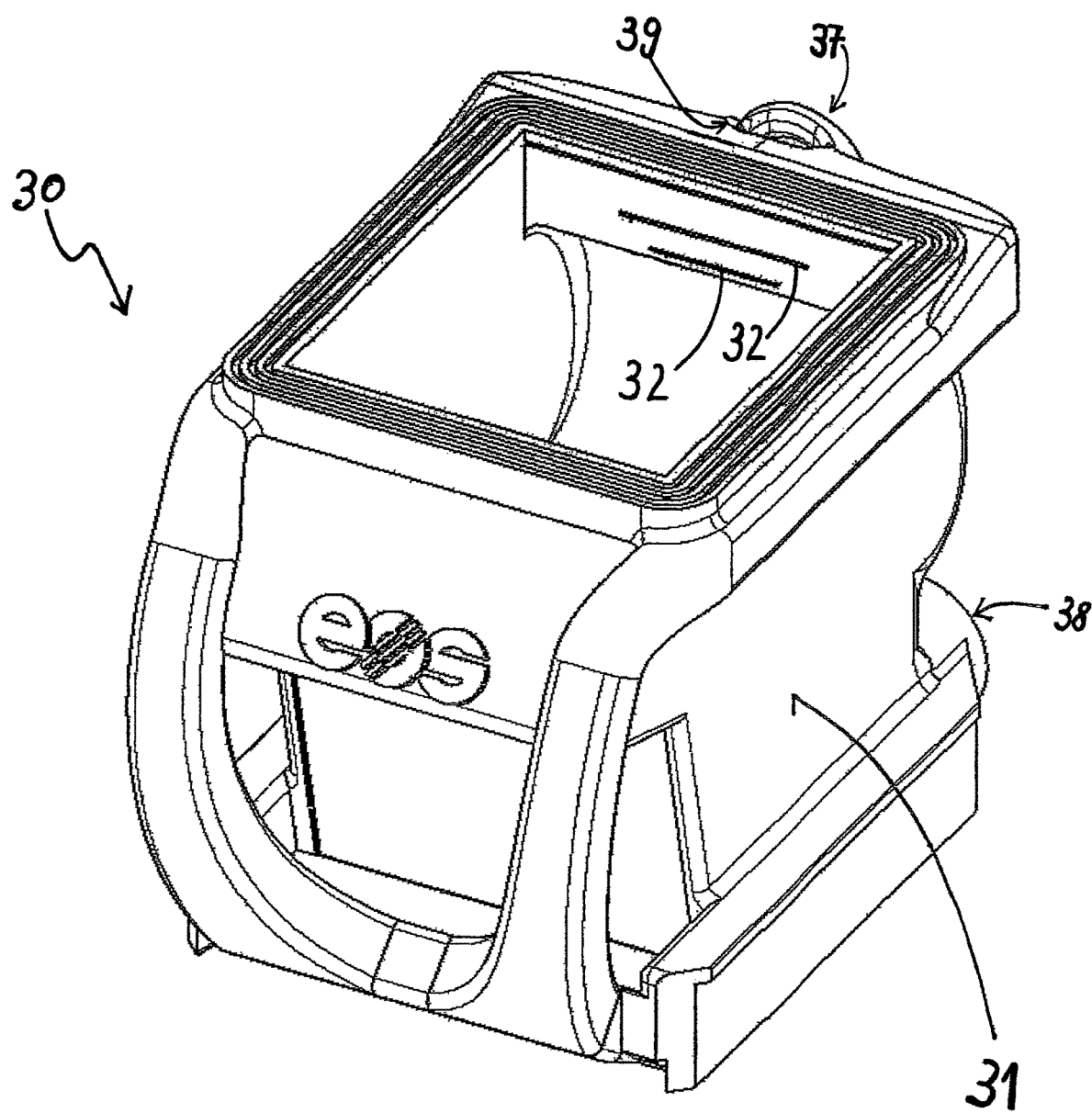
FIG. 3 is a schematic perspective view of a hollow body as a component part of a further example of an embodiment of the present invention.

In FIG. 3 a hollow body 30 according to another example of an embodiment is shown. In its inside, the hollow body 30 has slit-shaped gas inlet openings 32 connected to the gas inlet line 37. The hollow body 30 is connected to a gas outlet line 38 via a gas outlet opening 34 (not shown here). Further, the hollow body 30 has a gas inlet opening 39 at the outer side of the wall 31.

During operation, gas is supplied through the gas inlet openings 32 to the region of the process chamber 3 lying inside the hollow body 30. The gas inlet openings 32 are constructed such that the gas emanating from them forms a substantially laminar horizontal gas stream in the upper region inside the hollow body 30. Through the gas outlet line 38, more gas is discharged per unit time from the hollow body than it is supplied to it per unit time through the gas inlet openings 32. Gas is further supplied to the region of the process chamber 3 lying outside the hollow body 30 through the gas inlet opening 39. Subsequently, gas streams through the gap 35 into the region of the process chamber 3 lying inside the hollow body 30. If the hollow body 30 is open at its upper side and, thus, a gap 36 is present between the upper side of the hollow body 30 and the upper side of the wall 4 of the process chamber 3, gas streams also through the gap 36 into the region of the process chamber 3 lying inside the hollow body 30.

Thus, a first portion of the gas supplied through the gas inlet line 37 is supplied to the inside of the hollow body via the gas inlet openings 32, and a second portion of the gas is guided into the region of the process chamber 3 outside the hollow body 30 via the gas inlet opening 39. In the course of this, the first portion and the second portion of the gas are branched off from each other (not visible in the figure) from a common gas stream by a gas branching in a pre-chamber (here, in a rearward region) of the hollow body 30. Thus, an automatic gas branching is carried out and no programme-based guiding of gas streams is necessarily needed in this case.

It is thus preferred to connect the same gas inlet line 37 to the region of the process chamber 3 lying outside the hollow body 30 via a gas inlet opening 39 as well as to the region of the process chamber 3 lying inside the hollow body 30 via gas inlet openings 32.

Within the scope of the invention, it is contemplated to connect one or more gas inlet lines 37 to the region of the process chamber 3 lying outside the hollow body 30 via several gas inlet openings 39.

Within the scope of the invention, it is contemplated to connect one or more gas outlet lines 38 to the region of the process chamber 3 lying inside the hollow body 30 via several gas outlet openings 34.

The features of the two embodiments can be combined or exchanged with each other, where appropriate. For instance, a gas inlet opening 33 may be provided at the wall 4 of the process chamber 3 in the construction shown in FIG. 3 additionally or alternatively to the gas inlet opening 39 provided at the wall 31 of the hollow body 30.

Even though the present invention has been described on the basis of a laser sintering or laser melting apparatus 1, it is not limited to the laser sintering or laser melting. It may be applied to arbitrary methods of manufacturing a three-dimensional object by a layer-by-layer application and selective solidification of a building material 15. In the course of this, the building material 15 can be in powder form, as is the case, for instance, with the laser sintering or laser melting. As building material 15 in powder form, various kinds of powder may be used, in particular, metal powder, plastic powder, ceramic powder, sand, filled or mixed powders. However, the building material 15 can also be fluid, as is the case, for instance, with the methods known as "stereolithography".

The irradiation device 20 can, for instance, comprise one or more gas or solid state lasers or any other type of lasers, such as e.g. laser diodes, in particular VCSEL (Vertical Cavity Surface Emitting Laser), or VECSEL (Vertical External Cavity Surface Emitting Laser), or a row of these lasers. Generally, any device by means of which energy can be selectively applied to a layer of the building material as wave or particle radiation may be used as irradiation device 20. Instead of a laser, for instance, another light source, an electron beam, or any other energy or, respectively, radiation source may be used which is suitable for solidifying the building material. Instead of deflecting a beam, also the irradiating using a movable row irradiator may be applied. The invention may also be applied to the selective mask sintering, where an extended light source and a mask are used, or to the High-Speed-Sintering (HSS), where a material is selectively applied onto the building material which material enhances (absorption sintering) or reduces (inhibition sintering) the absorption of radiation at the points corresponding to the cross-section of the object and then an irradiation is performed non-selectively in a large-area manner or using a movable row irradiator.

As gas supplied to the process chamber, for instance, a noble gas, in particular, argon, nitrogen, or another protective gas, in particular, an inert gas, can be used. It is also possible to use hydrogen or any other reducing gas or (cleaned and/or dried) air or any other oxidising gas. Mixtures of different gases can also be used.

The invention claimed is:

1. A method of manufacturing a three-dimensional object by a layer-by-layer application and selective solidification of a building material, comprising the steps of:
applying a layer of the building material to a build area in a process chamber;
selectively solidifying those points of the applied layer which correspond to the cross-section of the object in this layer by exposure to a radiation;
repeating the steps of applying and selectively solidifying until the three-dimensional object is completed;
arranging a hollow body in the process chamber above the build area, the hollow body substantially extending from the build area in a direction of a top of the process chamber; and
supplying gas to the process chamber and discharging gas from the process chamber in such a manner that a lower pressure exists in the region of the process chamber lying within the hollow body than in the region of the process chamber lying outside the hollow body,
wherein a gas pressure which is higher than the pressure outside the process chamber is applied in the region of the process chamber lying outside the hollow body;
wherein due to the lower pressure within the hollow body, gas streams in from the region of the process chamber lying outside the hollow body through a first gap between the build area and the lower side of the hollow body into the region of the process chamber lying within the hollow body; and/or
wherein due to the lower pressure within the hollow body, gas streams in from the region of the process chamber lying outside the hollow body through a second gap between the top of the process chamber and an upper side of the hollow body into the region of the process chamber lying within the hollow body.

2. The method according to claim 1, wherein gas is supplied to and or discharged from the hollow body in such a manner that a gas pressure lower than the pressure outside the process chamber exists within the hollow body.

3. The method according to claim 1, wherein the radiation is generated by means of an irradiation device arranged outside the process chamber and is coupled into the process chamber through a coupling window arranged at the top of the process chamber.

4. The method according to claim 1, wherein gas is discharged from the process chamber through a gas outlet line connected to the inside of the hollow body via a gas outlet opening.

5. The method according to claim 1, wherein gas is supplied to the process chamber through a gas inlet line connected to the region of the process chamber lying outside the hollow body via a gas inlet opening.

6. The method according to claim 1, wherein gas is supplied to the process chamber through a gas inlet line connected to the inside of the hollow body via a gas inlet opening.

7. The method according to claim 6, wherein the gas supplied to the process chamber through the gas inlet opening is guided in the form of a substantially laminar stream through the region of the inside of the hollow body adjacent to the top of the process chamber.

8. The method according to claim 6, wherein a first portion of the gas supplied through the gas inlet line is supplied via the gas inlet opening connected to the inside of the hollow body and a second portion of the gas is guided into the region of the process chamber outside the hollow body via a gas inlet opening arranged at the outer side of the wall of the hollow body.

9. The method according to claim 1, wherein the application of a layer of the building material to the build area is performed by means of a recoater moving in a horizontal direction, and wherein the movement of the recoater is coupled to that of the hollow body.

10. A computer program loadable into a programmable control device and having program code means in order to perform all steps of a method according to claim 1 when the computer program is executed in the control device.

11. The method according to claim 1, further comprising providing a control device for an apparatus for manufacturing the three-dimensional object by the layer-by-layer application and selective solidification of the building material.

* * * * *